R. HASTINGS.
PHOTOGRAPHIC STAND.
APPLICATION FILED MAR. 17, 1919.

1,365,688.

Patented Jan. 18, 1921.
6 SHEETS—SHEET 1.

Inventor:
Russell Hastings
by Robt. P. Harris
Attorney

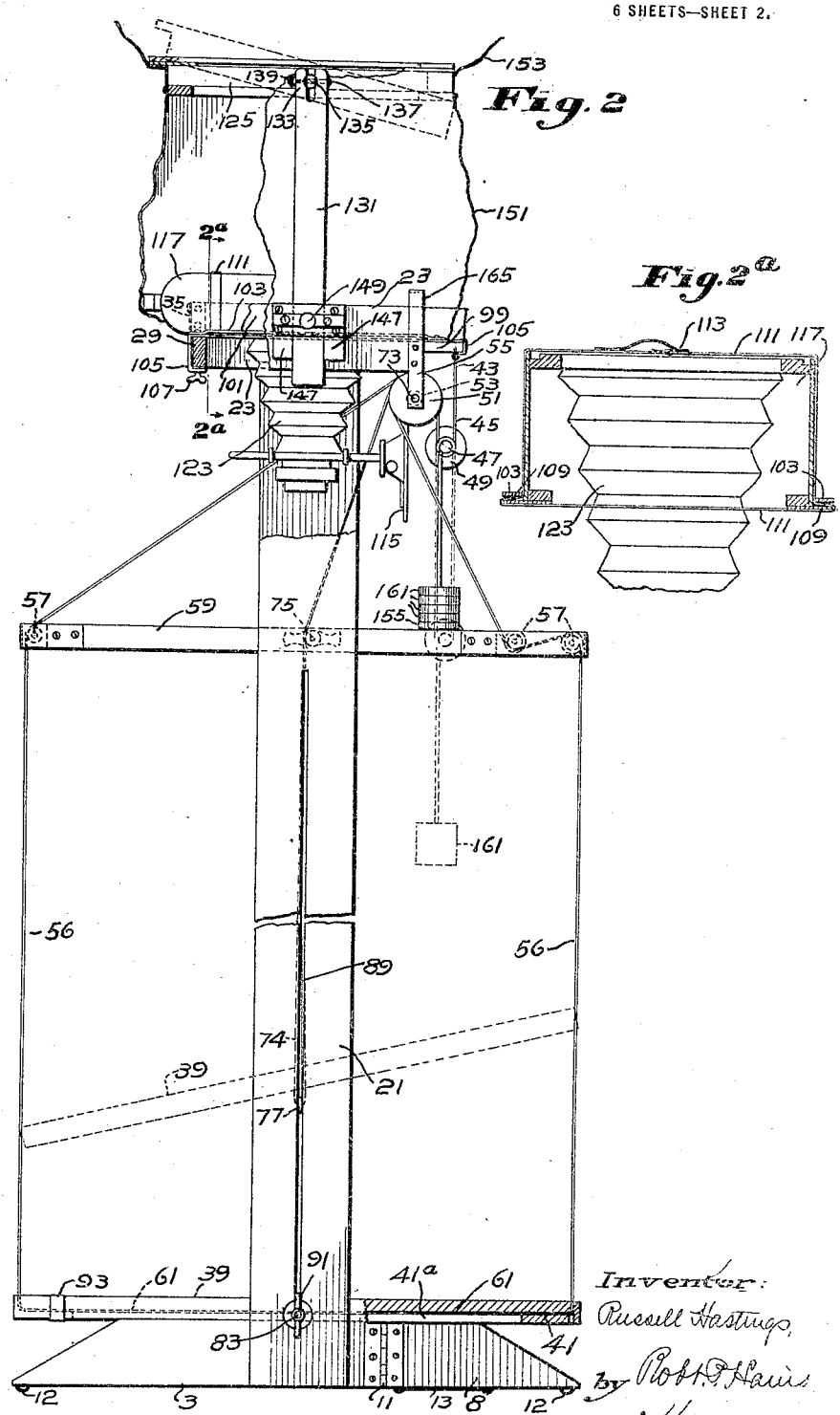

R. HASTINGS.
PHOTOGRAPHIC STAND.
APPLICATION FILED MAR. 17, 1919.
1,365,688.
Patented Jan. 18, 1921.
6 SHEETS—SHEET 3.
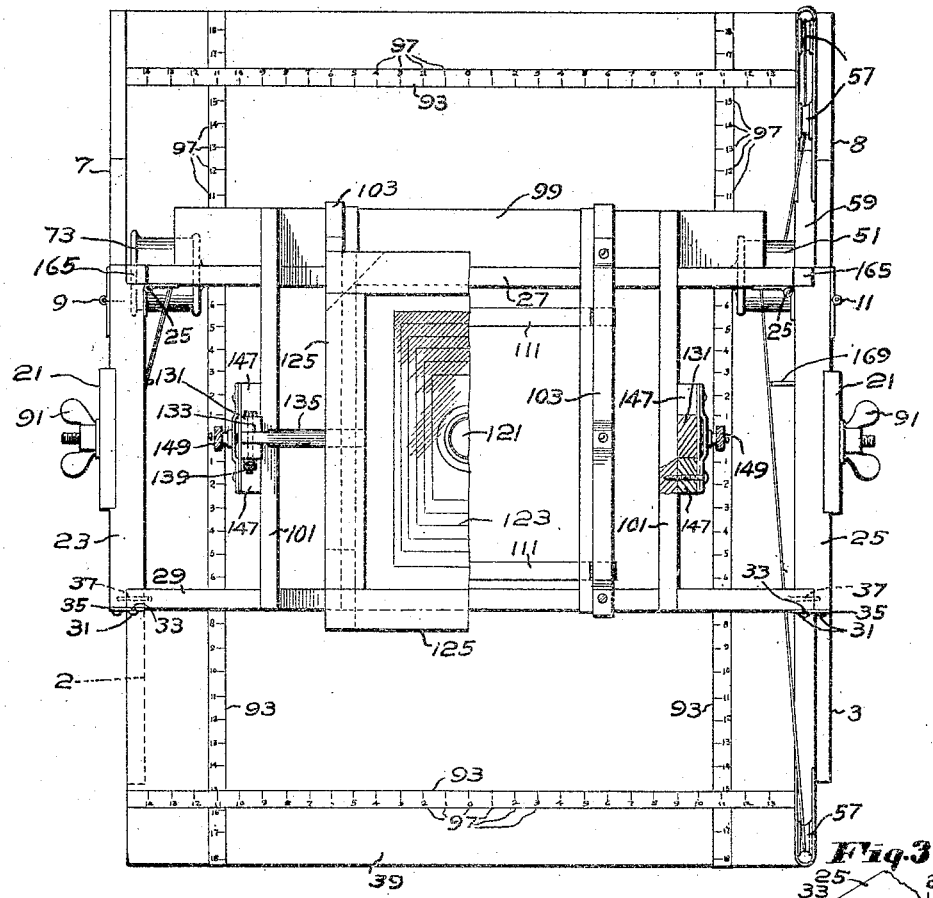
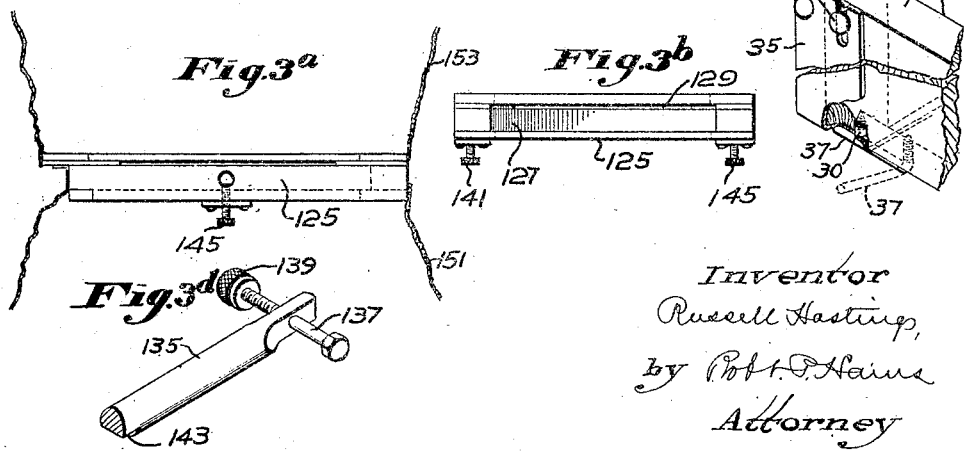
Inventor
Russell Hastings,
by Robt. P. Hains
Attorney R. HASTINGS.
PHOTOGRAPHIC STAND.
APPLICATION FILED MAR. 17, 1919.
1,365,688.
Patented Jan. 18, 1921.
6 SHEETS—SHEET 4.
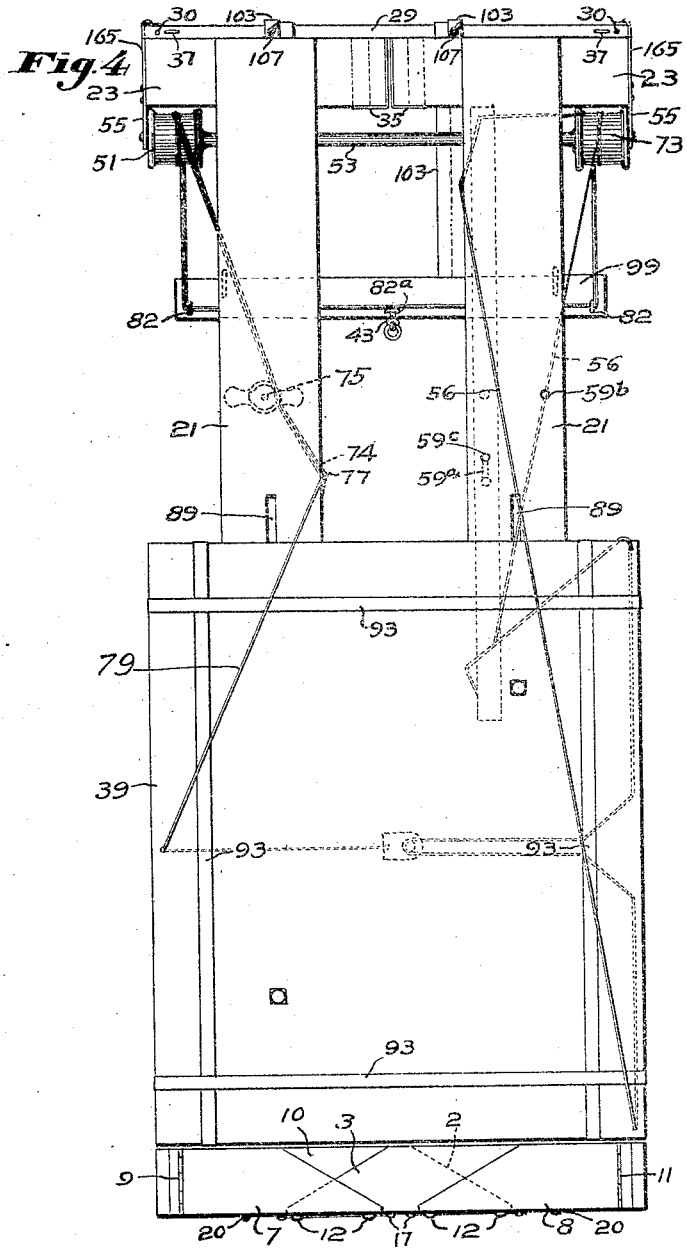
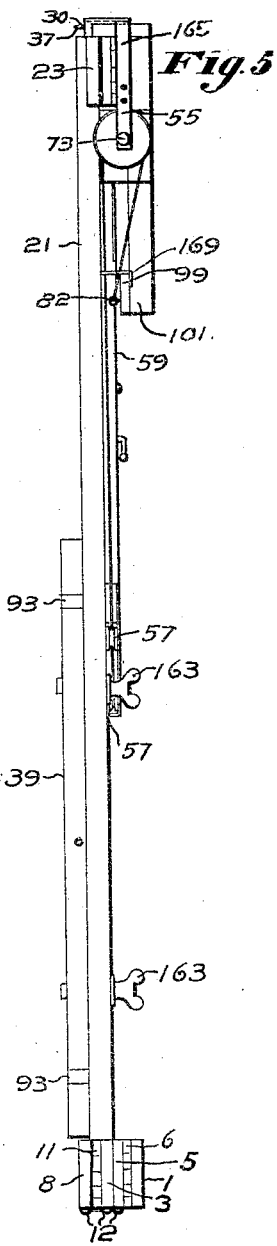
Inventor
Russell Hastings
by Robt. P. Harris,
Attorney

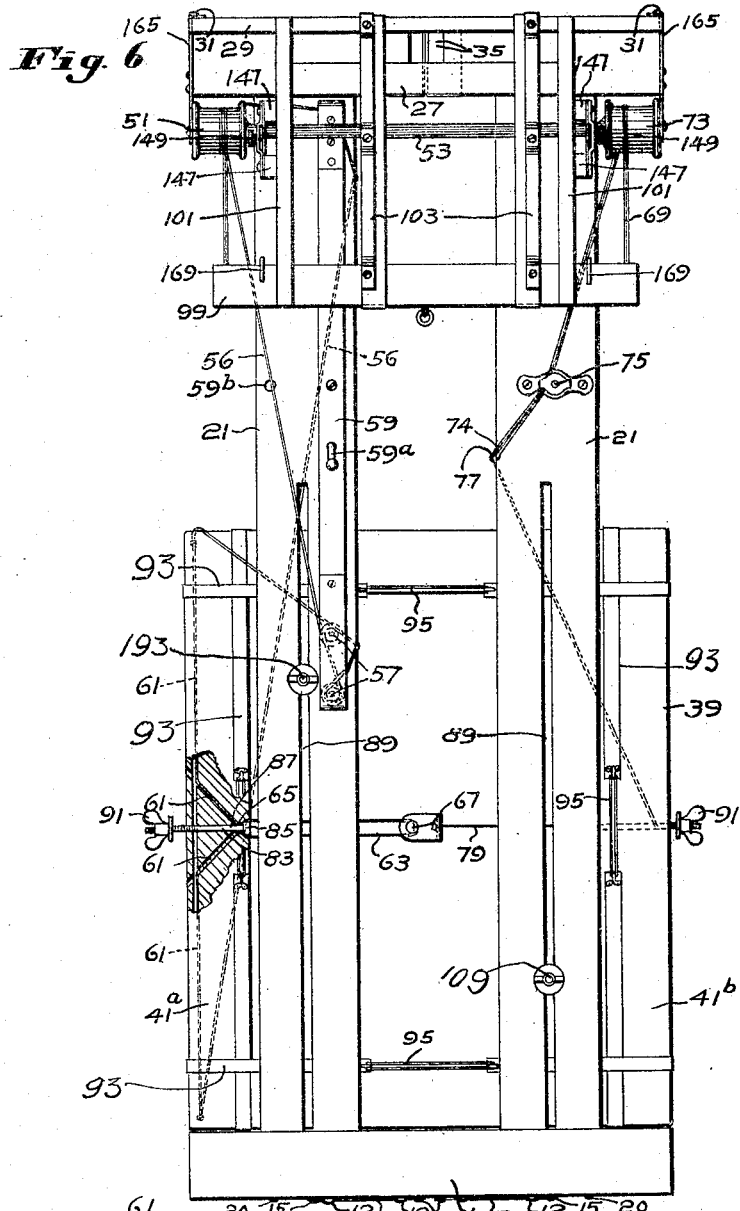
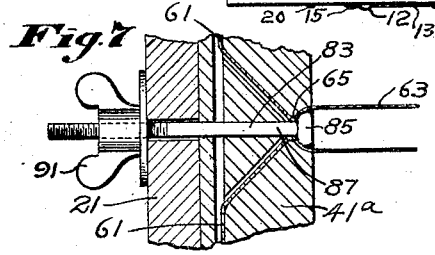

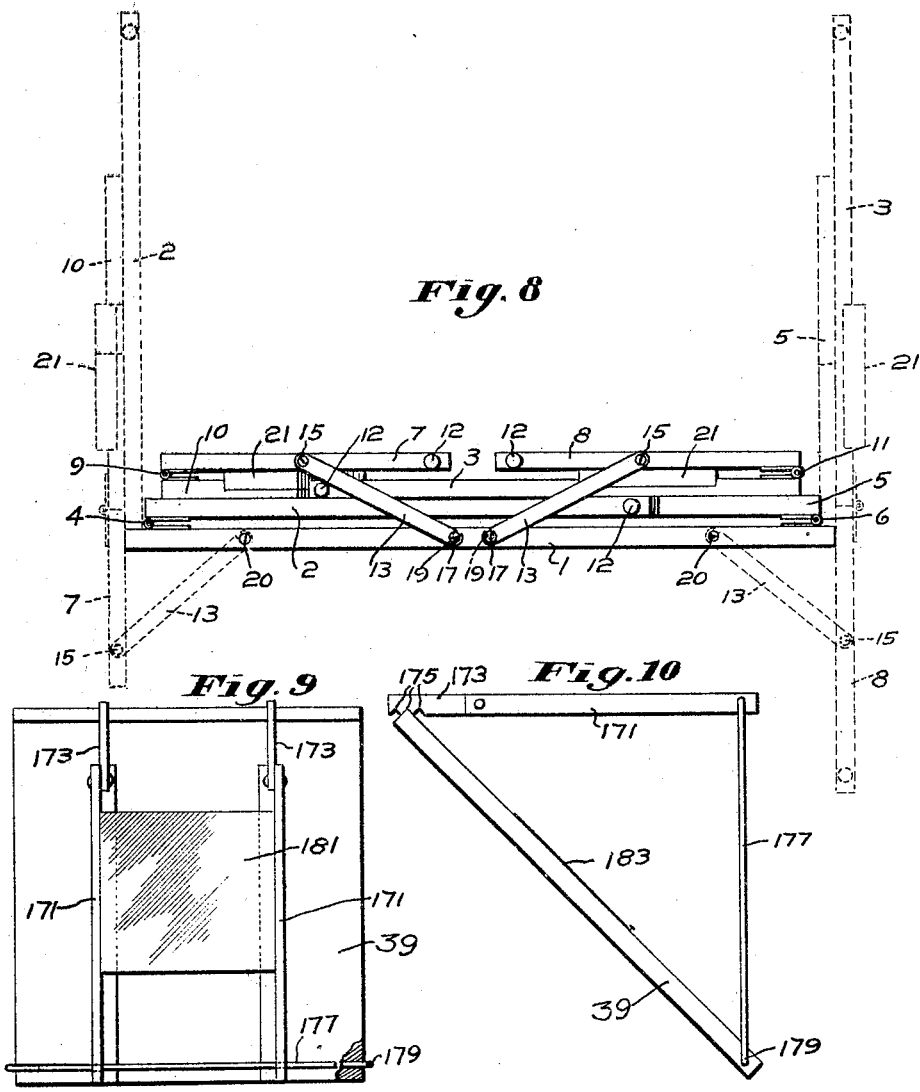

UNITED STATES PATENT OFFICE.

RUSSELL HASTINGS, OF BROOKLINE, MASSACHUSETTS.

PHOTOGRAPHIC STAND.

1,365,688. Specification of Letters Patent. Patented Jan. 18, 1921.

Application filed March 17, 1919. Serial No. 283,117.

*To all whom it may concern:*

Be it known that I, RUSSELL HASTINGS, a citizen of the United States, residing at Brookline, in the county of Norfolk and State of Massachusetts, have invented an Improvement in Photographic Stands, of which the following description, in connection with the accompanying drawings, is a specification, like characters on the drawings representing like parts.

The invention to be hereinafter described relates to photographic stands.

One of the purposes of the invention is to provide a universal stand which is simple and strong, cheap to construct, and adapted for use in performing various photographic operations, including making full sized, or reduced or enlarged prints from transparent negatives; photographing pictures, drawings, maps and reading matter; making full sized, or enlarged or reduced negative prints of pictures, drawings, maps and reading matter; making lantern slides or transparencies from transparent negatives or negative prints; and making full sized, or enlarged or reduced photographs of small objects, employing the lens of a camera or other photographic or microscopic lenses.

Another object of the invention is to provide a stand having a table for supporting various objects, such, for example, as sensitized printing paper, pictures, drawings, maps, reading matter, micro-objectives, microscopes and other objects, and means for quickly, readily and accurately adjusting the table for focusing purposes, or bringing the object on the table to the desired position with respect to a camera or a negative holder.

Another object is to provide simple and efficient means for securing the table in its different positions of adjustment.

Another object is to provide means to support a holder frame on the stand above a camera with provision for universal angular adjustment of the holder frame for correcting perspectives and other purposes.

Another object is to provide a stand which may be quickly and easily erected or folded into collapsed condition to occupy a small space for shipment and storage.

And still another object is to provide an attachment to be mounted on the table for use in making lantern slides.

With the aforesaid and other objects in view, the character of the invention will be best understood by reference to the following description of one good form thereof shown in the accompanying drawings, wherein:

Fig. 2 is a side elevation of the stand with parts thereof shown in section;

Figure 1:
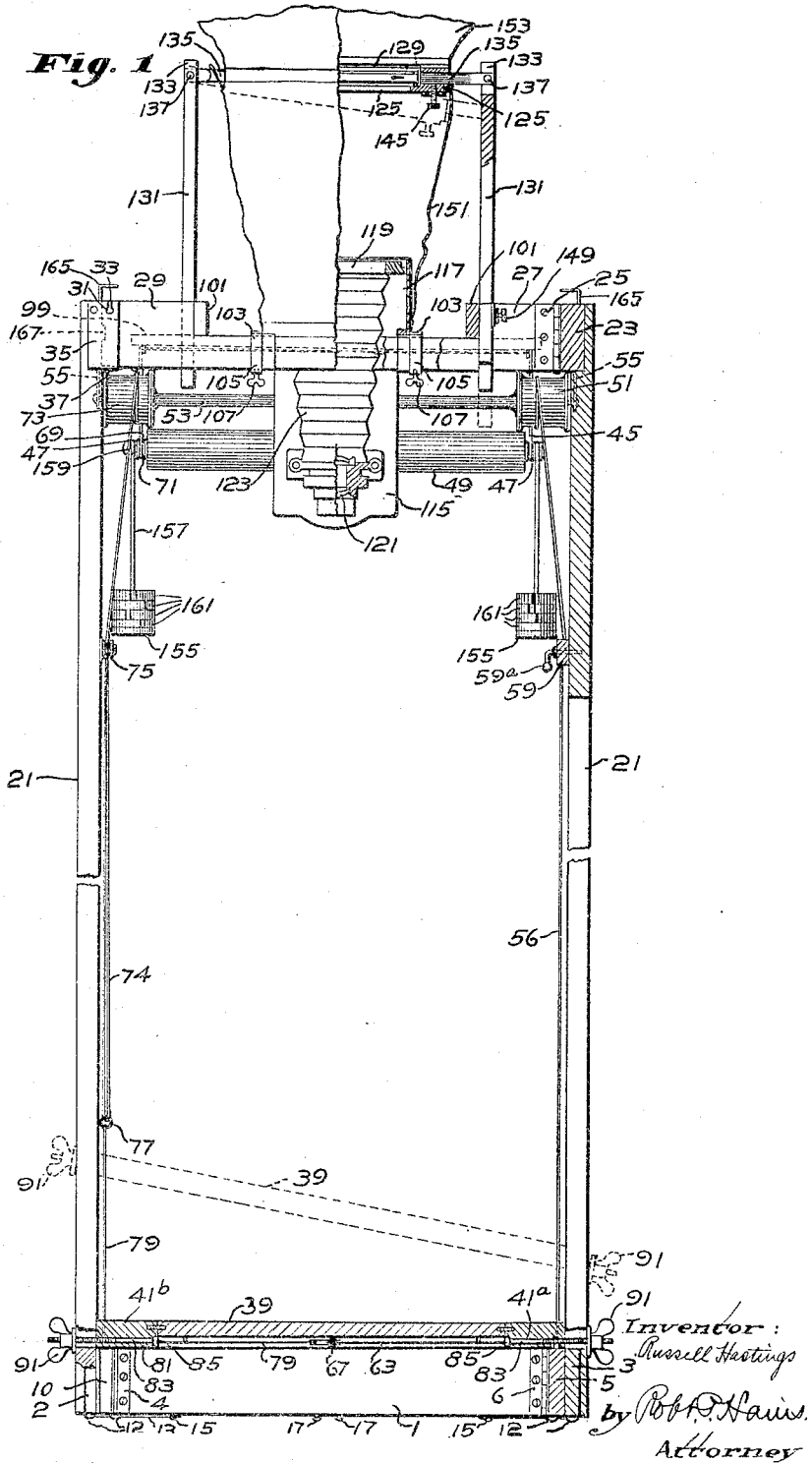
Figure 1 is a view partly in front elevation and partly in vertical section of a photographic stand embodying the invention.

Fig. 2$^a$ is a vertical section taken on line 2$^a$—2$^a$ of Fig. 2;

Fig. 3 is a view thereof partly in plan and partly in horizontal section;

Fig. 3$^a$ is a side elevation of the holder frame; and showing in section portions of hoods secured thereto;

Fig. 3$^b$ is an end elevation of the holder frame;

Fig. 3$^c$ is a detail perspective of a portion of the top frame;

Fig. 3$^d$ is a perspective of one of the stub shafts for the holder frame;

Fig. 4 is a top view of the stand in collapsed condition;

Fig. 5 is an end view of the collapsed stand;

Fig. 6 is a bottom view of the stand in collapsed condition;

Fig. 7 on an enlarged scale is a sectional detail of a locking device for the table;

Fig. 8 is a bottom plan of the base of the stand showing in full lines the position of the parts thereof when folded, and showing in dotted lines the position of the parts thereof when opened;

Fig. 9 is a plan of the attachment for supporting transparent negatives in making lantern slides;

Fig. 10 is a side elevation of said attachment; and

Fig. 11 is a side elevation of the counterbalance weights.

Referring to the drawings, the stand selected for illustration of one good form of the invention, comprises a base, in the present instance of the invention, having a cross bar 1 (Figs. 1 and 8) provided with long feet 2 and 3, the foot 2 being connected by a hinge 4 with the cross bar, and the foot 3 being secured to a member 5 connected by a hinge 6 with the cross bar. Short feet 7 and 8 are provided, the foot 7 being connected by a hinge 9 with a member 10 secured to the foot 2 referred to, and the foot 8 is connected by a hinge 11 to the foot 3 referred to. The members 5 and 10 are provided to facilitate compact folding of the feet into their collapsed relation shown in Fig. 8, and the ends of said members and the adjacent ends of the long feet 2 and 3 may be beveled to enable long feet to be provided in minimum space. The ends of the long and short feet may be provided with suitable rubber buttons 12 to prevent slip of the base on a smooth floor, or rocking of the base on the floor. Links 13 may have ends pivoted on screws 15 on the short feet, and may have opposite ends formed to present hooks 17 for engagement with pins 19 to hold the feet in collapsed condition and for engagement with pins 20 to hold the feet in open position.

When it is desired to fold the feet from collapsed to open position, the links 13 are released from the pins 17, and the short feet are swung on their hinges through arcs of 180° until the foot 7 is limited by the engagement of its inner end with the adjacent end of the member 10, and until the foot 8 is limited by the engagement of its inner end with the end of the long foot 3. Then the short feet will be substantially in alinement with the long feet. Then the long feet are swung on their hinges 4 and 6 through arcs of 90° until the inner end of the foot 2 engages a face of the cross bar 1, and until the inner end of the member 5 engages said face of the cross bar. The links 13 are now swung to have connection with the pins 20, and the feet will occupy the positions indicated in dotted lines in Fig. 8.

Rising from and connected to the feet 5 are a pair of uprights 21 (Figs. 1 and 2) having their upper ends connected to wings 23 connected in turn by hinges 25 with a top cross bar 27. Opposed to this top cross bar, a top lock bar 29 may be provided detachably connected to the wings 23, in the present instance, by studs 31 adapted to enter open slots 33 in flanges 35 secured to the ends of the wings 23 opposite to the hinged ends thereof, and by pins 30 (Fig. 3ᶜ) on the lower edge of the lock bar which enter holes in portions of the flanges 35. To lock said studs in said slots, hooks 37 may be provided on the under edges of the lock bar and adapted to be adjusted into and out of engagement with the lower edges of the flanges 35. This lock bar when connected to the wings described, will assist in holding the uprights in their open position, and serve to contribute to the support of devices to be described.

Next will be described the table which is disposed between the supports and adapted to sustain the various objects above referred to. This table, in the present instance of the invention, comprises a panel 39 set in a frame 41 flush with the upper side thereof, and the frame projects downward beyond the panel for purposes to be described.

It is desirable in carrying out the operations for which the stand is adapted, that the table shall be susceptible of adjustments to positions of varying inclination and elevation. To accomplish this, in the present instance of the invention, the table may be sustained on the stand by an arrangement of cords which desirably facilitates quick and accurate adjustment of the table. It will be understood that the term "cords" is to be used in a generic sense to cover any suitable flexible elements which will serve the purposes.

In the present instance of the invention, the cords are arranged to furnish a three-point support for the table, and comprise a cord doubled and having ends 43 (Fig. 4) anchored to a top frame member of the stand, portions presenting a loop 45 (Figs. 1 and 2) receiving a pulley 47 at one end of a weight 49 for counterbalancing the weight of the table, a portion looped about a drum 51 fast on a shaft 53 journaled in bearings carried by straps 55 secured to and depending from the top cross bar. The cord depends from the drum in the form of a loop 56 guided by rollers 57 on a spreader bar 59 pivotally connected to one of the uprights 21. The loop projects thence downward toward opposed ends of one edge of the table and thence in runs 61 (Figs. 2 and 6) inward toward the center of said edge, and the end of the loop 56 is extended thence through an opening 65 (Figs. 6 and 7) in one of the side members 41ᵃ of the frame of the table and transversely to said member toward the center of the table to form a smaller loop 63 which is received by a guide pulley 67 to be referred to.

A second cord is provided in the form of a loop having ends anchored to a top frame member and having a loop 69 (Fig. 1) receiving a pulley 71 at the opposite end of the counter-balance weight from the pulley 47 referred to, a portion looped about a drum 73 fast on the shaft 53 carrying the other drum referred to and rotative therewith. The cord depends from the drum in the form of a loop 74 guided by a pulley 75 (Figs. 1 and 2) on one of the uprights 21, and the lower end of the loop passes through an eye 77 (Figs. 1 and 6) on a cord 79 projecting toward the center of an edge of the table opposite to the edge receiving the other cord. The cord 79 projects thence through a hole 81 in one of the side members 41ᵇ of the frame of the table transversely across the table where it is connected to the guide pulley 67 referred to, for the loop 63 of the other cord.

The construction is such that the drums 51 and 73 or either of them may be grasped by the operator and rotated to take up or let off the cords and thereby raise or lower the table as desired. The counterbalance weight 49 will rise and fall during the falling and rising movements of the table and counterbalance the latter throughout the adjustments thereof. The portions of the cords looped about the drums have sufficient frictional engagement therewith so that the drums will serve to take up or let off the cords without slip between them.

When it is desired to adjust the table to positions of varying inclination, the table may be grasped and tilted to rock on either of two perpendicular axes parallel to the sides and ends of the table respectively. One of these axes may register with the portions of the cords passing transversely across the table beneath the same. In rocking the table on this axis, the table will not slide relatively to the cords 79, but will slide relatively to the loop 56 of the opposite cord, but without varying the length of said loop, and therefore, without varying the elevation of the table as a whole. In rocking the table on an axis perpendicular to the aforesaid axis, however, the table will slide along the cord 79 and also along the loop 56 of the opposite cord. Also, the table may be adjusted on both of these axes, and therefore, it is susceptible of adjustment on the cords to various angles in different planes.

It may be desirable at times to vary the effective length of the cords. To accomplish this, the cords for the two drums may have their upper ends brought toward each other through guide hooks 82 on the top frame and entered through an eye 82$^a$ on said frame.

Suitable means may be provided to secure the table in its different positions of adjustment. To accomplish this, bolts 83 (Figs. 6 and 7) may be provided having heads 85 and shanks 87 entered through the holes 65 and 81 referred to in the table members 41$^a$ and 41$^b$, and entered through and beyond elongated slots 89 (Fig. 2) in the uprights 21, and have hand nuts 91 threaded on the ends of the shanks projecting beyond said uprights. To prevent rotation of the shanks of the bolts, sides of their square heads 85 may engage the under face of the table. When the hand nuts 91 are released, the table may be adjusted up or down along the uprights, the shanks 87 of the bolts sliding in the slots 89 during such movement of the table as shown in Fig. 2. When it is desired to hold the table in its different positions of adjustment, the hand nuts may be tightened to cause said nuts to press against said uprights, and the heads of the bolts to press against the inner edge of the members 41$^a$ and 41$^b$ of the table.

To prevent sliding of the table relatively to the cords which sustain the same, the head 85 of one of the bolts may engage and press portions of the loop 63 of the cord against portions of one of the table members adjacent the opening 65, as will be noted in Fig. 7. Since the table slides relatively to the cord loop 63 in all of the angular adjustments thereof, the locking device described coöperating with said loop will serve to lock the table to the cord in all of said adjustments.

Suitable means may be provided to mask the sensitized paper, drawing or other object placed upon the table. To accomplish this, in the present instance, four bands 93 (Figs. 3, 4 and 6) may be provided of non-elastic material and having ends connected by elastic bands 95 at the under side of the table and serving to maintain the bands in taut embracing engagement with the table, but allowing the same to slide along the table into various parallel or inclined positions, and thus providing a mask having straight boundaries of any form or size desired. To facilitate adjustment of the bands, they may be marked with graduations 97 which may be numbered to facilitate reference thereto.

Suitable means may be provided to support and admit adjustment of cameras of different sizes on the stand. This means, in the present instance of the invention, comprises a top frame including the locking member 29 referred to, a horizontal bar 99 (Figs. 3, 4, 5 and 6), and cross bars 101 seated in recesses in said lock bar and in the top cross bar referred to. The cross bars 101 have ends permanently secured to said lock bar, and opposite ends projecting beyond the top cross bar and supporting the horizontal bar 99 with an edge thereof in engagement with the outer face of the top cross bar.

A pair of slides 103 (Figs. 1, 2, and 3) conveniently of metal may have ends formed to present hooks 105 adapted to embrace and slide along the lock bar 29 and the horizontal bar 99, and may be secured in different positions of adjustment on said bars by wing screws 107. The slides 103 may have slots 109 (Figs. 2 and 2$^a$) therein, adapted to receive a pair of straps 111 provided with buckles 113, said straps being adapted to embrace the box of a camera and secure the same to the slides 103. The slides 103 may be readily adjusted along the lock bar 29 and horizontal bar 99 to accommodate cameras of different sizes, and to enable the camera to be adjusted to different positions. Any suitable form of camera may be employed, a common form of camera 115 being shown herein for purposes of illustration and comprising a box 117, a plate or film holder 119, a lens 121 and a bellows 123 extending from the lens to the plate holder 119. When the box 117 of the camera rests on the slides 103, the bellows and lens may project downward through the space formed between the lock bar, horizontal bar and slide bars, as will be noted in Figs. 1 and 2.

For various purposes to be described it is desirable to provide and support a holder frame above the top frame of the stand. In the present instance of the invention, a holder frame 125 (Figs. 1, 2, 3, 3ᵃ and 3ᵇ) is provided of general rectangular form and provided with an opening 127 at one side thereof to admit the usual plate or film holder or other holder as desired. The frame may have vent slits 129 in the sides thereof to prevent overheating of a negative plate or film in the holder, from a lamp used in connection with the stand, as more fully hereinafter described.

Suitable means may be provided to support the holder frame, in the present instance, comprising a pair of uprights 131 having forks 133 at the upper ends thereof receiving flattened ends of stub shafts 135 which project into bearing holes in opposite side members of the frame holder. The outer ends of the stub shafts may be pivotally connected to the uprights 131 by bolts 137 (Fig. 3ᵈ) entered through the forks and the flattened ends of the stub shafts and provided with knurled nuts 139 to facilitate tightening and release of the nuts as desired. A hand screw 141 (Fig. 3ᵇ) is threaded into one of the side members of the frame holder, and is adapted to engage a flattened portion 143 (Fig. 3ᵈ) of one of the stub shafts to secure the holder frame in horizontal position. A hand screw 145 in another member of the holder frame is adapted to engage the other stub shaft to secure the holder frame at various angles other than the horizontal when rocked about the stub shafts.

The lower end portions of the uprights 131 project through and are adapted to slide in guides 147 (Figs. 1, 2 and 3) carried by the cross bars 101 referred to, said guides being provided with hand screws 149 adapted to engage the uprights 131 and lock the same in various positions of vertical adjustment.

The construction and arrangement of the supporting means for the holder frame is such that the holder may be adjusted and held in various positions of angular adjustment about perpendicular axes. For example, in adjusting the holder frame about one axis, one of the uprights 131 may be adjusted downward to bring the holder frame into the position indicated by dotted lines in Fig. 1, and to adjust said frame on its other axis, it may be rocked on the stub shafts 135 to its angular position shown in dotted lines in Fig. 2.

A hood 151 (Figs. 1, 2 and 3ᵃ) of any suitable opaque flexible material may have its upper edge secured to the holder frame and its lower edge may be provided with a cord to secure the lower edge tightly about the box of the camera, as will be noted in Fig. 1. A hood 153 of similar material may have its lower edge secured to the holder frame, and its upper edge (not shown) may be gathered around and secured to a holder for an electric lamp or other source of light.

In some cases objects of substantial weight may be placed on the table referred to, which will make it desirable to add weights to the counterbalance weight 49 referred to. In the present instance, for this purpose weights 155 (Figs. 1 and 2) may be provided connected to the lower ends of rods 157 having hooks 159 adapted to be hung over reduced ends of the weight 49, and additional weights 161 may be superposed on the weights 155 in any number required.

The stand described may be readily collapsed into compact condition to facilitate transportation thereof from place to place. To accomplish this, the uprights 131 may be removed from the top frame and then the top frame may be removed from the wings 23 and top cross bar 27 by lifting the lock bar 29 so as to remove the studs 31 from the slots 33 in the flanges 35 at the ends of the wings 23. Then the top frame may be adjusted so that the lock bar 29 moves back and rests upon the upper edge of the top cross bar 27, and the horizontal bar 99 moves downward into overlapping relation with the uprights 21 referred to. The spreader bar may be held in its active position by a pin 59ᵃ adapted to project through a hole in the spreader bar and into a hole 59ᵇ in one of the uprights 21. On removal of the pin the spreader bar may be arched to extend along the upright and be secured by inserting the pin in a hole 59ᶜ in the upright.

Then the links 13 may be released to allow collapsing of the feet 5 and 7, and the collapsing of the uprights, said links being readjusted to lock said parts in collapsed condition.

The table 39 having been removed from between the uprights before the folding thereof, is superposed on the uprights as indicated in Figs. 4, 5 and 6, and secured thereto by hand screws 163 entered through the slots in the uprights and screwed into tapped holes in the table 39.

To secure the top frame to the top cross bar when in collapsed condition, the bearing straps 55 for the drum shaft 53 may be extended upward along the ends of the top cross bar and present spring hooks 165 (Figs. 4, 5, and 6) adapted to snap into notches 167 (Fig. 1) in the lock bar 29. To hold the horizontal bar 99 against the uprights 21, a pair of hooks 169 (Figs. 4, 5 and 6) may be connected to said uprights and be adapted to be turned to overlie said horizontal bar and hold the same against said uprights.

When the stand is collapsed as described, the parts thereof will be in flat condition and occupy a small space, as will be noted in Fig. 5, thereby facilitating storage and transportation thereof. When the stand is to be used it may be readily opened and erected to its position shown in Figs. 1, 2 and 3.

The stand described is useful in performing various photographic operations, and some of these may be mentioned herein.

To print photographs, full size, enlarged or reduced from transparent negatives, the transparent negative is placed in a negative holder which is inserted in the holder frame, and the sensitized paper is placed on the table and secured thereto by the tapes 93 which will furnish a mask for the print of any size desired. The size of the picture may be varied by adjustment of the holder frame relatively to the lens of the camera, and the table can be adjusted along the uprights 21 to a position such that the image is in focus on the paper, which can be readily ascertained by looking at the image on the paper. The adjustment of the table is accomplished by manually grasping and rotating either or both of the drums 51, which enable a desirable nicety of adjustment of the table to produce perfect focus, but without altering the degree of enlargement. Light from an electric lamp above the holder frame or other source of light passing through the transparent negative and the lens of the camera, acts on the sensitized paper to print the picture.

The stand lends itself advantageously for use in taking photographs of pictures, drawings, maps, reading matter or small objects, any of which may be mounted on the table for this purpose. Light is thrown upon the object on the table; and the image thereof will appear on ground glass which may be mounted in the holder frame, and the focusing is accomplished by adjustment of the table by rotation of the drums while the operator stands in position to visualize the image on the ground glass. Then a plate holder containing a photographic plate or film is introduced into the holder frame and exposure is made and the photograph taken of the object on the table as usual in the operation of a camera.

The apparatus may also be used to make prints which will correct perspective faults of photographs. To accomplish this, the sensitized paper is placed on the table, a holder containing the transparent negative is introduced into the holder frame, and the table is adjusted to any desired angle and elevation for the purpose of focusing and correcting the perspective fault. The holder frame is also angularly adjusted, since it is essential to adjust the holder frame to cause the image to be in focus over the entire surface of the sensitized paper when the table has been inclined to correct the perspective fault. For example, corresponding edges of the table and holder frame would be adjusted toward or from each other, but to different degrees determined by examination of the image on the sensitized paper. Then the printing operation is performed in the usual manner.

In some cases it may be desirable to make a full size photograph but without making a full size negative. To accomplish this, the subject is placed on the table and a photograph thereof is taken. Then when sensitized paper is placed on the table without changing the adjustment of the latter, the desired full size print will be made in perfect focus.

In some cases it may be desirable to make microphotographs. To accomplish this, a microscope may be used instead of a camera. For this purpose the microscope is mounted on the table and a suitable light-proof hood is provided between the eye piece of the microscope and the photographic negative mounted in the holder frame. The microscope lens in this operation takes the place of a camera lens, and the object magnified by the microscope is photographed in the usual manner.

When it is desired to make negative prints of drawings, maps, printed matter or other matter, full size, or enlarged, or reduced, a holder containing the sensitized paper is inserted in the holder frame and the drawing or other matter is mounted on the table. Then light thrown upon the drawing or other matter will produce a negative print thereof on the sensitized paper.

In performing the various operations the camera may be slid in a horizontal plane along its supporting slides or with its slides along the top frame to adjust the same relatively to the table and plate holder frame, that the image may be centered on the ground glass without moving the object on the table.

An attachment for the stand may be provided to facilitate making lantern slides or transparencies from transparent negatives. This attachment, in the present instance of the invention, comprises a frame including a pair of bars 171 (Figs. 9 and 10) conveniently of angle form and having feet 173 provided with notches 175 for engagement with the upper edge of the table 39 when the latter is tilted to oblique position. The ends of the bars 171 opposite to said feet may be bored to receive a bail 177 having inturned ends 179 for insertion in holes in the lower end of the table. To make a lantern slide or transparency, a transparent negative 181 may be mounted on the angle bars 171. A mirror 183 may be mounted on the table, and a source of light may be placed at the right of the attachment (Fig. 10). A holder containing a sensitized plate is mounted in the holder frame, light reflected by the mirror passes through the transparent negative and thence through the lens of the camera to the sensitized plate and produces the print from the transparent negative.

The stand described is simple and strong in construction, cheap to manufacture, light, portable, and has the capacity for performing a great variety of photographic operations.

It will be understood that the invention is not limited to the specific embodiment shown, but that various deviations may be made therefrom without departing from the spirit and scope of the appended claims.

What is claimed is:—

1. A photographic stand comprising, in combination, a support, an object supporting table adjustable bodily upon said support, cords connected to said support and table to sustain the latter from the former, said table being adjustable to various inclinations on said cords, and means to take up or let off said cords to vary the elevation of said table.

2. A photographic stand comprising, in combination, a support, an object supporting table adjustable bodily upon said support, cords to sustain the table on the support, said table being adjustable to positions of varying inclination on said cords, and means to secure one of the cords to the table to hold said table in its different positions.

3. A photographic stand comprising, in combination, a support, an object supporting table adjustable bodily upon said support, cords to sustain the table on the support, said table being adjustable on said cords to positions of varying inclination in different planes.

4. A photographic stand, comprising, in combination, a support having uprights and means to sustain a camera, a table for supporting objects beneath the camera, cords to sustain the table at various elevations on said support and arranged to form loops in which the table rests, said table being adapted to slide relatively to said cords to positions of varying inclination, and means to secure said table in its various positions of adjustment to said cords and to said support.

5. A photographic stand, comprising, in combination, a support, a table for supporting objects, cords to sustain the table on the support, said table being adjustable to positions of varying inclination on said cords, a bolt having a head to confine a portion of the cord against a part of the table, and an adjustable hand nut for said bolt to secure or release the cord.

6. A photographic stand, comprising, in combination, a support, a table for receiving objects having a flange thereon, cords to sustain the table on the support, said table being adjustable to positions of varying inclination on said cords, and a bolt coöperating with said table flange to clamp the cord to said table or release the same therefrom.

7. A photographic stand, comprising, in combination, a support having a pair of uprights, a table disposed between said uprights and having a pair of flanges adjacent said uprights, cords connected to the support and table to sustain the latter from the former, and bolts coöperating with said table flanges and uprights to secure the table in different positions of adjustment.

8. A photographic stand, comprising, in combination, a support, a table for receiving objects, flexible means to sustain the table on the support having provision for adjustment of the table to positions of varying inclinations in different planes, and means for clamping said table to said flexible means to retain the table in various positions of adjustment.

9. A photographic stand, comprising, in combination, a folding frame provided with uprights, a top frame supported by said uprights, means on said top frame for supporting a camera, a plate holder mounted on the top frame above the camera supporting means and adjustable to various inclinations in different planes, a table disposed between said uprights and adjustable below the top frame and to different inclinations in different planes, and means to secure the table in different positions of adjustment.

10. A photographic stand, comprising, in combination, a support having a base, uprights and a top frame; a shaft carried by said top frame, drums on said shaft, a table disposed between said base and top frame, a counterbalance weight for said table, and cords connected to said top frame, having slack receiving loops in which the counterbalancing weight is supported, portions embracing said drums, and portions connected to said table that the latter may be raised and lowered on rotation of said drums.

11. A photographic stand, comprising, in combination, a support comprising a base, uprights and a top frame; a table disposed between said uprights, a shaft carried by said top frame, drums on said shaft, a counterbalance weight for said table, a spreader connected to one of said uprights and having guides thereon, and cords connected to said top frame, supporting the counterbalance weight, looped about the drums and connected to the table, the cords between one of the drums and the table being guided by the guides on said spreader.

12. A photographic stand, comprising, in combination, a support having uprights, a table disposed between said uprights, a counterbalance weight for said table, supplemental weights for counterbalancing objects placed on the table, a shaft carried by said support, drums on said shaft, and cords connected to said support, supporting said counterbalance weights, looped about said drums, and connected to said table, that the latter may be vertically adjusted on rotation of said drums.

13. A photographic stand, comprising, in combination, a support having uprights, a table disposed between said uprights, a shaft carried by said uprights, a pair of drums on said shaft, a counterbalance weight, a spreader on one of said uprights, a double cord having ends connected to said uprights, a loop connected to said weight, a portion looped around one of said drums, and a loop guided by said spreader and connected to said table at spaced points at one side of said table, and a double cord connected to said uprights having a loop connected to said counterbalance weight, a portion looped about the other drum, and a loop connected centrally to the opposite side of said table.

14. A photographic stand, comprising, in combination, a support, a table mounted thereon, a counterbalance weight for said table, a shaft carried by said support, drums on said shaft, a double cord having ends connected to said support, a loop connected to said counterbalance weight, a portion looped about one of said drums, and a loop extended to one side of the table and guided along an edge thereof toward the center of said side and thence transversely toward the center of the table, and a double cord having ends connected to said support, a loop connected to said weight, a portion looped about the other drum, and a loop extending toward an edge of the table and connected to the end of the loop of the other cord beneath the table.

15. A collapsible photographic stand, comprising, in combination, a base having a cross bar, feet hinged to said cross bar, a top cross bar, wings hinged to said top cross bar, uprights connected to said feet and wings and foldable therewith toward said cross bar, a locking bar to hold said uprights in open position, a table disposed between said uprights, means to raise and lower said table along said uprights, and means detachably to secure said table to said uprights, that the table may be moved to allow folding of said uprights toward said cross bar.

16. A collapsible photographic stand, comprising, in combination, a base having a cross bar and feet hinged to said cross bar, a top cross bar, wings hinged to said top cross bar, uprights connected to said feet and wings and foldable therewith toward said top cross bar, means to hold said parts in open position, a table disposed between said uprights, means detachably to secure said table to said uprights, and a frame to support a camera mounted on said top cross bar and removable therefrom to allow folding of said uprights toward said cross bars.

17. A collapsible photographic stand, comprising, in combination, a basing having a cross bar, and feet hinged to said cross bar, a top cross bar, wings hinged to said top cross bar, uprights connected to said feet and wings and foldable therewith toward said cross bar, a lock bar to hold the uprights in open position, and a plate holder frame mounted on said top cross bar and lock bar and removable from the former to permit folding of said uprights toward said cross bars.

18. A collapsible photographic stand, comprising, in combination, a base having a cross bar, feet hinged to said cross bar, a top cross bar, wings hinged to said top cross bar, uprights connected to said feet and wings and foldable therewith toward said cross bars, a lock bar for holding said wings in open position, a camera holder mounted on said top cross bar and lock bar, and a plate holder mounted on said top cross bar and lock bar, said plate holder being removable from said bars to allow folding of said uprights toward said cross bars.

19. A collapsible photographic stand, comprising, in combination, a base including a cross-bar, pairs of feet having the feet of each pair foldingly connected, and hinge means connecting the pairs of feet adjacent their folding connections to the ends of the cross-bar and in position to have each foot fold toward the cross-bar, uprights connected to one foot of each pair and folding therewith, a table, and means detachably to secure said table to said uprights.

20. A collapsible photographic stand comprising, in combination, a base including a cross-bar, pairs of feet having the feet of each pair foldingly connected, hinge means connecting the pairs of feet adjacent their folding connections to the ends of the cross-bar and in position to have each foot fold toward the cross-bar, uprights connected to one foot of each pair and folding therewith, means to secure the feet in open and folded position, a table, and means detachably to secure said table to said uprights.

21. A photographic stand comprising, in combination, an upright support, a table thereon adjustable to positions of varying inclinations, a plate supporting frame having one end thereof adapted to rest on the upper edge of said table when the latter is tilted to a substantial angle, and a bail for supporting the other end of said frame in substantially a horizontal plane from the lower portion of the inclined table.

22. A photographic stand comprising, in combination, an upright support, a table thereon adjustable to positions of varying inclination, a mirror upon said table, a plate supporting frame having one end thereof adapted to rest on the upper edge of said table when the latter is tilted to a substantial angle, and a bail for supporting the other end of said frame from the lower end of the table and in position to have light reflected up from said mirror through a plate supported by the supporting frame.

In testimony whereof, I have signed my name to this specification.

RUSSELL HASTINGS.